UNITED STATES PATENT OFFICE.

FLORENCE EMILY EATON, OF BLACKROCK, DUBLIN, IRELAND.

PLASTIC COMPOSITION.

1,199,251. Specification of Letters Patent. Patented Sept. 26, 1916.

No Drawing. Application filed December 22, 1915. Serial No. 68,244.

*To all whom it may concern:*

Be it known that I, FLORENCE EMILY EATON, a subject of the King of Great Britain and Ireland, residing at 27 Newtown avenue, Blackrock, county Dublin, Ireland, have invented certain new and useful Improvements in Plastic Compositions; and I do hereby declare the following to be a full, clear, and exact description of the invention, such as will enable others skilled in the art to which it appertains to make and use the same.

This invention relates to an improved plastic composition for use in the manufacture of dolls artificial limbs, and other articles at present wholly or in part made of papier-mâché, china, wood or the like, articles made from this composition resembling those made from china but being much less liable to injury if allowed to fall.

In carrying my invention into effect I incorporate with any suitable adhesive a mixture of calcium carbonate (chalk), calcium phosphate (powdered bones), and silica (sand), in suitable proportions, and pour or press the composition into molds or otherwise employ it for the above mentioned purposes. Any suitable coloring matter may be added to the composition. The following percentages produce satisfactory mixtures:—calcium carbonate 86 to 98, calcium phosphate 1.98 to 12.5, and silica 0.02 to 1.5. In substitution for these ingredients I may use an equivalent weight of powdered barn fowls' egg-shells. As an adhesive I find very efficient a mixture of a quart of glue solution, a teaspoonful of Venice turpentine, and half a pint of a strong solution of alum, any desired coloring matter being added to the solution of glue. Another adhesive consists of a solution of casein, water-glass and gum arabic.

The invention can be carried into effect in two principal ways. According to one of these methods of use, the ingredients in or in about the proportions mentioned are incorporated together in powder form and then thoroughly mixed with the chosen adhesive so as to form a dough-like plastic substance that can be pressed into well greased metal molds. When the other method of procedure is made use of the adhesive and the powdered ingredients are made up into a cream or liquid mixture sufficiently thick to be just pourable into electrotype or other metal molds where it is rolled around quickly to form a skin over the inside of the mold, after which it is poured off and the operation repeated as often as is considered needful.

I wish it to be understood that I do not confine myself to the precise proportions of the various ingredients, as they may be varied without departure from the invention, but the proportions I have mentioned are those which have given satisfactory results.

What I claim as my invention and desire to secure by Letters Patent is:—

1. The herein described composition of matter consisting of calcium carbonate, calcium phosphate, silica and an adhesive.

2. The herein described composition of matter consisting of powdered barn fowls' egg-shells and an adhesive.

3. The herein described composition of matter consisting of calcium carbonate, calcium phosphate and silica, compounded with an adhesive consisting of a solution of glue, Venice turpentine and alum.

4. The herein described composition of matter consisting of powdered barn fowls' egg-shells, and an adhesive consisting of a solution of glue, Venice turpentine and alum.

In testimony whereof, I have affixed my signature, in presence of two witnesses.

FLORENCE EMILY EATON.

Witnesses:
C. F. HENRY,
GABELLA GLÖCKLER.

Copies of this patent may be obtained for five cents each, by addressing the "Commissioner of Patents, Washington, D. C."